United States Patent Office 3,109,770
Patented Nov. 5, 1963

3,109,770
DIALKOXYPHOSPHINYL CARBALKOXYALKYL DISULFIDE PESTICIDES
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Apr. 10, 1961, Ser. No. 101,674
10 Claims. (Cl. 167—22)

This invention relates to a new class of phosphorus containing pesticides and a process for utilizing the same.

In particular, this invention relates to new compounds having a novel disulfide configuration which provides new and valuable characteristics. These new compounds have been found to be useful in the elimination and control of numerous insect pests as will be shown hereafter.

These new compounds are phosphoro disulfides which may be represented by the formula

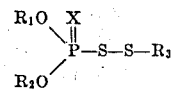

wherein $R_1$ and $R_2$ are the same or different alkyl radicals, $R_3$ is alkyl, aryl, alkoxyalkyl, mercaptoalkyl, carbalkoxyalkyl or carbaryloxyalkyl and X is oxygen or sulfur. They may be made according to one of the following general reactions:

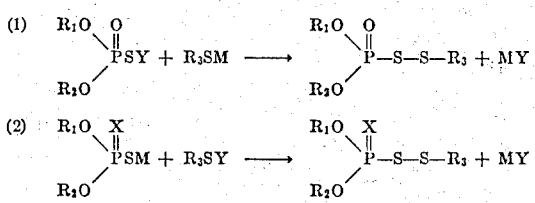

wherein $R_1$, $R_2$, $R_3$, and X are as defined above, Y is a halogen and M is hydrogen or an alkali metal.

Among the alkyl radicals which we have found suitable for the phosphorus ester portion of the molecule are the methyl, ethyl, propyl, butyl, octyl and decyl radicals, as well as combinations resulting in mixed esters such as methyl ethyl, ethyl octyl, methyl butyl, ethyl propyl and the like. These same alkyl radicals are representative of those suitable for $R_3$ which, in addition, may also be an aryl radical such as phenyl, chlorophenyl, nitrophenyl, cresyl, xylyl and the like; a carbalkoxyalkyl radical such as carbethoxymethyl, carbethoxyethyl, carbmethoxymethyl and the like; a dicarbalkoxyalkyl radical such as 1,2-dicarbethoxyethyl, 1,2-dicarbmethoxyethyl, 2,3-dicarbethoxypropyl and the like; and alkyl radicals containing ether and thioether linkages such as ethoxyethyl, methoxyethyl, ethoxylmethyl, propoxymethyl, ethylmercaptoethyl, ethylmercaptomethyl and the like.

The process is preferably carried out in an inert solvent by adding approximately stoichiometric quantities of O,O-dialkyl phosphorosulfenyl halide or the equivalent acid or its alkali metal salt to the appropriate mercaptan or its alkali metal analog. The reaction appears to be nearly instantaneous when carried out at about 0° C. to room temperature. The product is recovered by boiling off the inert solvent and by-product hydrogen halide. In the case where the by-product is an alkali metal halide, it may be removed by simply filtering prior to evaporating the inert solvent.

The following examples illustrate the product of this invention.

EXAMPLE 1

In a flask was placed 31.0 grams of O,O-diethyl-phosphorosulfenyl chloride in 150 ml. of ether. The solution was cooled to 10° C. and 18.4 grams of tert. butyl mercaptan was added over a 30 minute period. The resulting product was allowed to warm to room temperature, after which the ether was removed and the product stabilized by heating to 60° C. at 1 mm. of Hg pressure. The product weighed 34.5 grams, had an index of refraction $N_D^{25}=1.4757$ and analyzed as 12.5% P and 23.8% S compared to theoretical values of 12.0% P and 24.7% S for $(C_2H_5O)_2P(O)SSC_4H_9$.

EXAMPLE 2

To a solution of 37.6 grams (0.2 mole) of $$(CH_3O)_2P(S)SH$$

in 75 ml. of ether was added 0.2 mole of a previously prepared solution of $C_2H_5SCl$ in $CCl_4$. The addition was made at 10° C. over a 30 minute period. After the addition was complete the solvent was evaporated on a steam bath and the product stabilized by heating to 55° C. at 1 mm. Hg. The yield was 40.2 grams of product having an index of refraction $N_D^{25}=1.5542$, a boiling point of 95° C. at 1.0 mm. Hg and analyzing 15.3% P, 44.3% S compared to 14.2% P and 44.0% S theoretical for $(CH_3O)_2P(S)SSC_2H_5$.

EXAMPLE 3

In a flask was placed 16.5 grams of benzenethiol and 100 cc. of ether. After cooling to 10° C., 30.8 grams of diethyl phosphorosulfenyl chloride was added over a 30 minute period. The crude reaction mixture was washed with two 25 ml. portions of saturated NaCl solution and then dried over $Na_2SO_4$. The crude product was stabilized by heating to 50° C. at 1 mm. to give 40.6 grams of substantially pure $(C_2H_5O)_2P(O)SSC_6H_5$. A small portion was distilled to give a product which boiled at 112° C. at 0.4 mm., had an index of refraction $N_D^{25}=1.5126$ and analyzed as 11.6% P and 21.8% S (theory 11.1 and 23.0).

EXAMPLE 4

To a solution of 0.15 mole of $ClSCH_2COOC_2H_5$ in 100 ml. of $CCl_4$ was added 23.7 grams of $$(CH_3O)_2P(S)SH$$

over a 30 minute period at 10° C. After the addition was complete, the reaction mixture was allowed to stir for 30 minutes while allowing it to warm to room temperature. The solvent was removed and the product stabilized by heating to 50° C. at 1 mm. to give 37.5 grams of substantially pure $(CH_3O)_2P(S)SSCH_2COOC_2H_5$ with an index of refraction $N_D^{25}=1.5390$ and which analyzed as 10.4% P and 32.8% S (theory 11.2 and 34.8).

EXAMPLE 5

In a flask was placed 30.9 grams of diethyl mercaptosuccinate and 100 ml. of dry ether. The solution was cooled to 5° C. after which 30.7 grams of diethyl phosphorosulfenyl chloride was added dropwise over a 30 minute period. The reaction mixture was heated to 40° C. for 15 minutes, the ether solution washed with two 25 ml. portions of saturated NaCl solution and the product stabilized to 60° C. at 1.5 mm. A yield of 57.4 grams of substantially pure

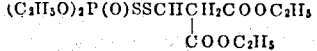

resulted. A small portion was distilled in a molecular still and found to boil at 98°–100° C. at 0.01 mm. It had an index of refraction $N_D^{25}=1.4538$ and analyzed as 8.0% P and 16.0% S (theory 8.2 and 16.8).

Using the processes of the foregoing examples, the following additional compounds were made.

Table I

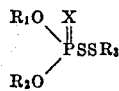

| Example | $R_1$ | $R_2$ | X | $R_3$ | $N_D^{25}$ | Found Percent P | Found Percent S | Theory Percent P | Theory Percent S | Yield, Percent |
|---|---|---|---|---|---|---|---|---|---|---|
| 6 | $C_2H_5$ | $C_2H_5$ | O | $C_4H_9(t)$ | 1.5489 | 11.4 | 36.0 | 11.4 | 35.0 | 100.0 |
| 7 | $CH_3$ | $CH_3$ | S | $C_4H_9(t)$ | 1.4671 | 12.5 | 40.0 | 12.6 | 38.0 | 100.0 |
| 8 | $C_2H_5$ | $C_2H_5$ | S | $C_4H_9(n)$ | 1.5262 | 11.6 | 33.4 | 11.3 | 35.0 | 98.0 |
| 9 | $CH_3$ | $CH_3$ | S | $C_4H_9(n)$ | 1.5425 | 12.7 | 39.4 | 12.6 | 39.0 | 98.0 |
| 10 | $C_2H_5$ | $C_2H_5$ | O | $C_2H_5$ | 1.4876 | 12.8 | 25.8 | 13.5 | 27.8 | 84.0 |
| 11 | $C_2H_5$ | $C_2H_5$ | S | $C_2H_5$ | 1.5208 | 14.0 | 38.0 | 12.6 | 39.0 | 96.5 |
| 12 | $C_2H_5$ | $C_2H_5$ | O | $C_6H_4Cl(p)$ | 1.4863 | 10.0 | 20.2 | 9.9 | 20.5 | 85.0 |
| 13 | $CH_3$ | $CH_3$ | O | $C_6H_4Cl(p)$ | 1.5801 | 9.3 | 21.1 | 10.8 | 22.4 | 98.5 |
| 14 | $C_2H_5$ | $C_2H_5$ | O | $CH_2COOC_2H_5$ | 1.4744 | 10.7 | 22.0 | 10.6 | 22.1 | 85.2 |
| 15 | $C_2H_5$ | $C_2H_5$ | S | $CH_2COOC_2H_5$ | 1.5230 | 9.9 | 29.6 | 9.8 | 30.4 | 88.0 |
| 16 | $CH_3$ | $CH_3$ | O | $CH_2COOC_2H_5$ | 1.4960 | 12.5 | 23.5 | 11.9 | 24.6 | 97.0 |
| 17 | $C_2H_5$ | $C_2H_5$ | S | $-\underset{CH_2COOC_2H_5}{CHCOOC_2H_5}$ | 1.5125 | 8.4 | 22.5 | 7.9 | 24.6 | 92.0 |
| 18 | $CH_3$ | $CH_3$ | S | $-\underset{CH_2COOC_2H_5}{CHCOOC_2H_5}$ | 1.5225 | 8.9 | 26.4 | 8.6 | 26.5 | 99.0 |
| 19 | $CH_3$ | $CH_3$ | O | $-\underset{CH_2COOC_2H_5}{CHCOOC_2H_5}$ | 1.4842 | 8.8 | 17.9 | 8.9 | 18.5 | 97.5 |
| 20 | $C_2H_5$ | $C_2H_5$ | O | $C_2H_4SC_2H_5$ | 1.5186 | 10.6 | 34.4 | 10.7 | 33.1 | 100.0 |
| 21 | $C_2H_5$ | $C_2H_5$ | S | $C_2H_4SC_2H_5$ | 1.5517 | 13.0 | 45.1 | 11.3 | 46.7 | 100.0 |

The class of compounds characterized by the foregoing examples has been found to have valuable pesticidal properties. In particular these compounds are valuable in the control of common insect pests. By the term "insect" we do not intend to be limited to the narrow technical usage of this term to include only six-legged pests, but intend the broader more common usage which includes spiders, mites, ticks caterpillars, nematodes and the like.

In the following described tests demonstrating the utility of our new compounds, three insect species representing three insect orders were used. These species are (1) American cockroach—*Periplaneta americana*—Orthoptera (designated AR)
(2) House fly—*Musca domestica*—Diptera (designated HF)
(3) Spotted milkweed bug—*Oncopeltus fasciatus*—Heteroptera (designated MWB)

In conducting the tests, the compounds are made up into solutions, normally 0.1% concentration, using "wet water." The latter contains 2.5 grams of Vatsol and 1.0 gram of Methocel per twenty liters of water. Each solution is then sprayed onto the insects using a DeVilbiss hand sprayer in a fume hood. Mortality is reported after 72 hours as percent kill/percent concentration.

The following results were obtained using the compounds of this invention.

Table II

| Example | Insect | | |
|---|---|---|---|
| | HF | AR | MWB |
| 1 | 100/.1 | 20/.1 | 70/.1 |
| 3 | 64/.0001 | 0/.1 | 0/.1 |
| 5 | 84/.1 | 40/.1 | 60/.1 |
| 12 | 92/0.0001 | 0/.1 | 0/.1 |
| 14 | 72/.1 | 20/.1 | 10/.1 |
| 16 | 100/.1 | 0/.1 | 0/.1 |
| 19 | 28/.1 | 0/.1 | 0/.1 |

From these data it can be seen that these new compounds are valuable insecticides. Although the specific examples show the use of aqueous solutions of these compounds as insecticides, they may also be used in the form of emulsions, non-aqueous solutions, wettable powders, vapors, and dusts as may be best fitted to the conditions of use.

The concentration normally used for initial testing is a 0.1% solution. As noted above, however, some of these new compounds are effective pesticides at much lower levels, as low as 0.0001% in some instances. Since the effective concentration may vary with each compound and each pest to which it is applied, a general numerical range of concentrations cannot be stated. It is well within the skill of the art, however, to determine the effective concentration necessary to kill a significant proportion of a specific pest or combination of pests under certain conditions of application.

The foregoing description is given for clearness of understanding only and no unnecessary limitations should be understood therefrom as modifications will be obvious to those skilled in the art.

We claim:

1. Compounds having the formula:

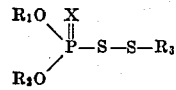

wherein $R_1$ and $R_2$ are alkyl radicals, X is selected from the class consisting of oxygen and sulfur, and $R_3$ is, carbalkoxyalkyl.

2. A compound having the formula:

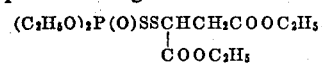

3. A compound having the formula:

$(C_2H_5O)_2P(O)SSCH_2COOC_2H_5$

4. A compound having the formula:

$(C_2H_5O)_2P(O)SSCH_2COOC_2H_5$

5. A compound having the formula:

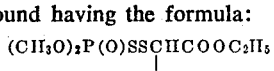

6. A process for controlling insect pests comprising applying thereto an effective concentration of a compound having the formula:

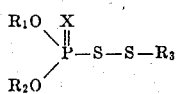

wherein $R_1$ and $R_2$ are alkyl radicals, X is selected from the class consisting of oxygen and sulfur, and $R_3$ is carbalkoxyalkyl.

7. A process for controlling insect pests comprising applying thereto an effective concentration of the compound of claim 2.

8. A process for controlling insect pests comprising applying thereto an effective concentration of the compound of claim 3.

9. A process for controlling insect pests comprising applying thereto an effective concentration of the compound of claim 4.

10. A process for controlling insect pests comprising applying thereto an effective concentration of the compound of claim 5.

References Cited in the file of this patent

UNITED STATES PATENTS

| | | |
|---|---|---|
| 2,578,652 | Cassaday | Dec. 18, 1951 |
| 2,828,241 | Birum | Mar. 25, 1958 |
| 2,965,535 | Birum | Dec. 20, 1960 |
| 2,976,309 | Schrader | Mar. 21, 1961 |
| 3,018,215 | Pianka | Jan. 23, 1962 |

OTHER REFERENCES

Kabachnik et al.: "Bull. Acad. Sci., U.S.S.R. Div. Chem. Sci.," 1954, pages 639–641.

Kabachnik et al.: "J. Gen. Chem. U.S.S.R.," October 1955, volume 25, No. 10, pages 1867–1873.